United States Patent
Andrassy et al.

(10) Patent No.: US 10,503,833 B2
(45) Date of Patent: Dec. 10, 2019

(54) DEVICE AND METHOD FOR NATURAL LANGUAGE PROCESSING

(71) Applicant: SIEMENS AKTIENGESELLSCHAFT, München (DE)

(72) Inventors: Bernt Andrassy, München (DE); Pankaj Gupta, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 253 days.

(21) Appl. No.: 15/498,517

(22) Filed: Apr. 27, 2017

(65) Prior Publication Data

US 2018/0157643 A1 Jun. 7, 2018

(30) Foreign Application Priority Data

Dec. 6, 2016 (IN) .............. 201611041671

(51) Int. Cl.
*G06F 17/27* (2006.01)
*G06N 3/04* (2006.01)
*G06N 3/08* (2006.01)
*G06N 5/02* (2006.01)

(52) U.S. Cl.
CPC ........ *G06F 17/2785* (2013.01); *G06F 17/278* (2013.01); *G06N 3/0445* (2013.01); *G06N 3/08* (2013.01)

(58) Field of Classification Search
CPC ...................................... G06F 17/27
See application file for complete search history.

(56) References Cited

U.S. PATENT DOCUMENTS

| | | | |
|---|---|---|---|
| 8,504,490 B2* | 8/2013 | Nie | G06Q 10/10 706/12 |
| 2016/0147871 A1* | 5/2016 | Kalyanpur | G06F 16/288 707/728 |

OTHER PUBLICATIONS

Gupta et al., "Table Filling Multi-Task Recurrent Neural Network for Joint Entity and Relation Extraction", pushed to https://www.github.com on Oct. 2, 2016, retrieved Mar. 3, 2019. (Year: 2016).*

(Continued)

*Primary Examiner* — Brian L Albertalli
(74) *Attorney, Agent, or Firm* — Schmeiser, Olsen & Watts LLP

(57) ABSTRACT

A device for relation extraction in a natural language sentence having n words is suggested, the device comprising: a recurrent neural network for joint entity and relation extractions of entities and relations between the entities in the sentence, and an entity-relation table for storing entity labels for the entities and relation labels for the relations, wherein both the entity labels and the relation labels are defined as instances of binary relationships between certain words $w_i$ and $w_j$ in the sentence, with $i \in [1, \ldots, n]$, and $j \in [1, \ldots, n]$, wherein each of the entity labels is a first binary relationship for $i=j$, and wherein each of the relation labels is a second binary relationship for $i \neq j$, wherein the recurrent neural network is configured to fill the cells of the entity-relation table and includes a forward neural network and a backward neural network.

20 Claims, 7 Drawing Sheets

(56) References Cited

OTHER PUBLICATIONS

Miwa, Makoto, and Mohit Bansal. "End-to-end relation extraction using lstms on sequences and tree structures." arXiv preprint arXiv :1601.00770 (2016). (Year: 2016).*

Miwa, Makoto, and Yutaka Sasaki. "Modeling joint entity and relation extraction with table representation." Proceedings of the 2014 Conference on Empirical Methods in Natural Language Processing (EMNLP). 2014. (Year: 2014).*

Li, Qi, and Heng Ji. "Incremental joint extraction of entity mentions and relations." Proceedings of the 52nd Annual Meeting of the Association for Computational Linguistics (vol. 1: Long Papers). vol. 1. 2014. (Year: 2014).*

Daojian Zeng, Kang Liu, Siwei Lai, Guangyou Zhou, and Jun Zhao, 2014, "Relation classification via convolutional deep neural network" in "Proceedings of COLING"; 2014.

Thien Huu Nguyen et al: "Relation Extraction: Perspective from Convolutional Neural Networks"; Proceedings of the 1st Workshop on Vector Space Modeling for Natural Language Processing; pp. 39-48; XP055273940; Stroudsburg, PA, USA; DOI: 10.3115/vl/WI5-1506; 2015.

Dongxu Zhang and Dong Wang, 2015, "Relation classification via recurrent neural network" in ArXiv; 2015.

* cited by examiner

DEVICE AND METHOD FOR NATURAL LANGUAGE PROCESSING

CROSS-REFERENCE TO RELATED APPLICATION

This application claims priority to IN Application No. 201611041671 having a filing date of Dec. 6, 2016, the entire contents of which are hereby incorporated by reference.

FIELD OF THE DISCLOSURE

The disclosed relates to a device and to a method for entity and relation extraction in natural language processing of a sentence having n words.

BACKGROUND

Relation extraction in sentences can be performed based on a pipeline of two separate subtasks: Entity Recognition (ER) and Relation Classification (RC). First, named entities (e.g. "John Doe"-->PERSON) are detected and then a relation classification on the detected entities mentioned (e.g. "work_for") is performed. Relation classification is defined as the task of predicting the semantic relation between the annotated pairs of nominals (also known as relation arguments). These annotations, for example named entity pairs participating in a relation, are often difficult to obtain.

Relation classification is treated as a sentence-level multiclass classification problem, which often assumes a single relation instance in the sentence. Further, it is conventionally assumed that entity recognition affects the relation classification, but is not affected by relation classification.

For example, deep learning methods such as recurrent and convolutional neural networks (Daojian Zeng, Kang Liu, Siwei Lai, Guangyou Zhou, and Jun Zhao, 2014, "Relation classification via convolutional deep neural network" in "Proceedings of COLING"; Dongxu Zhang and Dong Wang, 2015, "Relation classification via recurrent neural network" in ArXiv; Thien Huu Nguyen and Ralph Grishman, 2015, "Relation extraction: Perspective from convolutional neural networks" in "Proceedings of the NAACL Workshop on Vector Space Modeling for NLP") treat relation classification as a sentence-level multi-class classification, and rely on the relation arguments provided in the sentence. Therefore, these methods are incapable of handling multiple relation instances in a sentence and cannot detect corresponding entity mention pairs participating in the relation detected.

Accordingly, it is one aspect of the invention to improve both entity and relation extraction in natural language processing.

BRIEF SUMMARY

According to a first aspect, a device for relation extraction in a natural language sentence having n words is proposed. The device comprises a recurrent neural network for joint entity and relation extractions of entities and relations between the entities in the sentence, and an entity-relation table for storing entity labels for the entities and relation labels for the relations, wherein both the entity labels and the relation labels are defined as instances of binary relationships between certain words $w_i$ and $w_j$ in the sentence, with $i \in [1, \ldots, n]$, and $j \in [1, \ldots, n]$. Each of the entity labels is a first binary relationship for $i=j$, and each of the relation labels is a second binary relationship for $i \neq j$. The recurrent neural network is configured to fill the cells of the entity-relation table and includes a forward neural network and a backward neural network, wherein the forward neural network is configured to provide a representation of a current history for a certain word of the sentence, and wherein the backward neural network is configured to provide a representation for a following context of the certain word of the sentence.

Natural language processing can be described as the task of extracting information, such as entity and relation information from written texts. For example, the (partial) sentence " . . . Richard Kahn, officer for the American Diabetes Association in Alexandria, Va." contains information about a person (Richard Kahn), an organization (the American Diabetes Association) and two locations (Alexandria, Va.) (this sentence is part of the so-called CoNLL04 dataset, which is available at http://cogcomp.cs.illinois.edu/data/er/conll04.corp; and will be referred to as ES1 in the following). The classes like person, organization, location, and so on can be called an entity. Further, there are certain relations between these entities. For example there is a relation "work_for" between the entity pair "Richard Kahn" and "American Diabetes Association". The aim of entity and relation extraction is to extract this kind of information from natural language text in joint framework.

A recurrent neural network comprises, for example, a network of neural units which are connected by a directional connection or by a forward and a backward connection. As such, an activation or signal can propagate in both directions between two connected neurons of the recurrent neural network. For example, a first neuron has a certain level of activation. Depending on the connection to a second neuron, the activation can travel or spread to the second neuron. Mathematically, it can be imagined that each connection between two neurons has a certain threshold value, which determines at which activation level the activation or signal can propagate along the connection and spread to the next neuron. The threshold value of a connection is not fixed, but is dynamically adjustable as the neural network processes infor-information. This dynamic adjustment can also be called learning.

Entity recognition and relation classification are together referred as relation extraction. The relation extraction may be an extraction of a triplet including a first entity, a relation, and a second entity. Entity recognition or entity extraction is the task of recognizing, in a given sentence, the entities that are present. Entity recognition can be considered a subtask of relation extraction. For example, entity types are "person", "organization", "location", and so on. Relation classification is the task of classifying the relations between the entities in a given sentence. Also relation classification can be considered a subtask of relation extraction. For example, relations between entities are "work_for", "based_in", "located_in", and so on. Table 1 shows an example of entity types and relations between them.

TABLE 1

Entity types Person, Location, Organsation and Other and exemplary relations "Live_in", "Work_for", "Located_in" and "ORGBased_in" between them.

|  | Person | Location | Organsation | Other |
|---|---|---|---|---|
| Person |  | Live_in | Work_for | ⊥ |
| Location | Live_in | Located_in | ORGBased_in | ⊥ |

TABLE 1-continued

Entity types Person, Location, Organsation and Other
and exemplary relations "Live_in", "Work_for",
"Located_in" and "ORGBased_in" between them.

|  | Person | Location | Organsation | Other |
|---|---|---|---|---|
| Organisation | Work_for | ORGBased_in | ⊥ | ⊥ |
| Other | ⊥ | ⊥ | ⊥ | ⊥ |

The sign "⊥" means "no relation"

For example, the recurrent neural network employs a model $M_{ER}$ for entity recognition and a model $M_{RC}$ for relation classification. The recurrent neural network for joint entity and relation extractions of entities and relations between the entities in the sentence can be considered a unified framework, which jointly performs both tasks. For example, model parameters for $M_{ER}$ and $M_{RC}$ can be shared, providing a naturally interdependent combined model.

However, in order to obtain better results, it is advantageous to consider the two subtasks together. The present recurrent neural network is configured to jointly model entity recognition and relation classification via a unified multi-task recurrent neural network. This way, interdependencies between entity recognition and relation classification are taken into account by the recurrent neural network, in contrast to a step-by-step process, which would for example first perform entity recognition and then, based on the extracted entities, relation classification.

An entity-relation table is employed for storing the entity labels for the entities and relation labels for the relations. The entity-relation table can be represented as a square matrix with cells $c_{ij}$, i=1 ... n, j=1 ... n. The columns i of the table or matrix are labeled, from left to right, with the words of a given sentence and the rows j are labeled, from top to bottom, with the words of the sentence. Entity labels and relation labels comprise not only a predefined category or class (e.g. the entity-type "Person" or the relation-type "Work_for"), but also a probability of the assignment. For example, if the word "Devon" appears in sentence, it can denote a person with the name "Devon" or a location (the county of Devon in England). In this example, the a priori probability might be 50% for each case. However, from the context and the position of the word in the sentence, and in particular from the relations the word participates in, it becomes clear, which entity-class is appropriate in a given case. For example, if the person "Richard Kahn" in ES1 is exchanged by "Devon" and the relation "Work_for" is found to apply for "Devon", it can be concluded that "Devon" either is a person, or an organization, because persons work_for organizations (which is a priori knowledge). On the other hand, given the knowledge that "Devon" either denotes a person or a location, it becomes clear that, in this case, "Devon" must be a person. This example shows how relation classification can affect entity recognition and vice versa.

The diagonal entries of the entity-relation table correspond to the entity labels, which can also be called named entities, while the off-diagonal elements correspond to relation labels.

In particular, the entries of the entity-relation table correspond to the entity labels or relation labels with the highest probability to be true.

In this context, the device can also be called Table-Filling Multi-Task Recurrent Neural Network (TFMTRNN). Both entity pairs and the corresponding relations between the entities can be detected in a single framework with an entity-relation table representation. In particular, the recurrent neural network can be called a unified multi-task recurrent neural network.

The proposed device has the advantage that it alleviates the need of search heuristics and explicit entity and relation label dependencies in joint entity and relation extraction. Further, an advantage of the table structure is that modelling multiple relations per sentence needs no extra effort, since these correspond to an entity-relation table with multiple off-diagonal cells (i.e. i≠j) with the corresponding relations. For example, in ES1, "American Diabetes Association" will have two off-diagonal labels, which are both "ORGbased_in" (organization based in), with respect to "Alexandria" and with respect to "Va".

The bi-directional recurrent neural network comprises a forward neural network and a backward neural network. For example, the table-filling can be performed as follows. A given sentence of length n, represented as a sequence of n words, is plugged into the forward neural network and at the same time into the backward neural network. The forward neural network provides a (hidden) representation $h_{f_i}$ of the history $w_1, \ldots, w_i$ of word $w_i$. The backward neural network provides a (hidden) representation $h_{b_j}$ of the following context $w_j, \ldots, w_s$ for word $w_j$. The repre-representations $h_{f_i}$ and $h_{b_j}$ are both fed into $h_{i,j}$ (a hidden layer of the recurrent neural network that calculates or provides the outputs), which then predicts the entity labels and/or relation labels for the given combination. Here, $h_{i,j}$ is called a composition. For example, a number of output nodes, each of which corresponds to a certain entity or relation, are activated in dependence of the composition. The output node with the highest activation potential is the entity or relation with the highest probability to be true. The result of this composition, given as the entity label or the relation label, is written into the corresponding cell $c_{ij}$ of the entity-relation table. This process is performed for each composition of words possible. In principle, $n^2$ compositions are needed to fill the whole table. However, since the table or matrix is symmetric, for off-diagonal elements $c_{ij}=c_{ji}$ when i≠j. Therefore, the process can be reduced to a total of $n(n+1)/2$ compositions.

As described above, the recurrent neural network performs natural language processing on a word level. For the case of entities that span more than a single word, tags may be introduced, which identify the word as being a part of a multi-word entity and also, which position the word takes in the entity. This can be done, for example, by using the so-called BILOU scheme. Here, each letter denotes a certain position of a word in an entity. For example, the "Person"-entity "Richard Kahn" may be recognized as a two word entity by labelling "Richard" as "B-Person" and "Kahn" as "L-Person", where "B" stands for beginning and "L" stand for last. The other letters of BILOU have the meaning: "I"—inside, "O"—outside, "U"—unit.

As an example, the entity-relation table for ES1, as obtained from applying the proposed device, is shown in Table 2.

TABLE 2

Entity-relation table obtained from processing the sentence "Richard Kahn, officer for the American Diabetes Association in Alexandria, Va.".

|  | Richard | Kahn | , | Officer | For | the | American | Diabetes | Association | in | Alexandria | , | Va | . |
|---|---|---|---|---|---|---|---|---|---|---|---|---|---|---|
| Richard | B-PER | | | | | | | | | | | | | |
| Kahn | ⊥ | L-PER | | | | | | | | | | | | |
| , | ⊥ | ⊥ | 0 | | | | | | | | | | | |
| officer | ⊥ | ⊥ | ⊥ | 0 | | | | | | | | | | |
| for | ⊥ | ⊥ | ⊥ | ⊥ | 0 | | | | | | | | | |
| the | ⊥ | ⊥ | ⊥ | ⊥ | ⊥ | 0 | | | | | | | | |
| American | ⊥ | ⊥ | ⊥ | ⊥ | ⊥ | ⊥ | B-ORG | | | | | | | |
| Diabetes | ⊥ | ⊥ | ⊥ | ⊥ | ⊥ | ⊥ | ⊥ | I-ORG | | | | | | |
| Association | ⊥ | work_for | ⊥ | ⊥ | ⊥ | ⊥ | ⊥ | ⊥ | L-ORG | | | | | |
| in | ⊥ | ⊥ | ⊥ | ⊥ | ⊥ | ⊥ | ⊥ | ⊥ | ⊥ | 0 | | | | |
| Alexandria | ⊥ | ⊥ | ⊥ | ⊥ | ⊥ | ⊥ | ⊥ | ⊥ | ORGBased_in | ⊥ | U-LOC | | | |
| , | ⊥ | ⊥ | ⊥ | ⊥ | ⊥ | ⊥ | ⊥ | ⊥ | ⊥ | ⊥ | ⊥ | 0 | | |
| Va | ⊥ | ⊥ | ⊥ | ⊥ | ⊥ | ⊥ | ⊥ | ⊥ | ORGBased_in | ⊥ | Located_in | ⊥ | U-LOC | |
| . | ⊥ | ⊥ | ⊥ | ⊥ | ⊥ | ⊥ | ⊥ | ⊥ | ⊥ | ⊥ | ⊥ | ⊥ | ⊥ | 0 |

The cells are filled with the named entities in accordance with the BILOU-scheme, where PER = Person, ORG = Organization, LOC = Location and the sign "⊥" means "no relation".

In other words, the present recurrent neural network reduces the entity recognition and relation classification tasks to a table-filling problem and models their interdependencies.

According to an embodiment, the recurrent neural network is a context-aware recurrent neural network framework configured for word-level relation learning via word-pair compositions utilizing their contexts in the sentence.

In particular, the context is utilized by using the representation of the current history by the forward neural network and the representation of the following context by the backward neural network in the compositions.

According to a further embodiment, the recurrent neural network is configured to model interdependencies in entity and relation extraction tasks for the joint entity and relation extractions of the entities and the relations in the sentence.

The proposed recurrent neural network based framework is configured to jointly model the entity and relation extraction tasks to learn the correlations between them, by sharing the model parameters and representations. Separate output nodes and weight matrices may be used for entity and relation classification. An entity label is assigned to a word, while a relation is assigned to a word pair. Therefore, entity extraction is performed only when the representations of the same word from the forward neural network and the backward neural network are composed. Dynamics of the proposed table-filling multi-task recurrent neural network (TF-MTRNN) architecture are given in set of equations (1):

Set of equations (1):

$$s_{R_{i,j \in i:N}} = g(W_{hR} h_{i,j})$$

$$s_{E_{i,j=i}} = g(W_{hE} h_{i,j})$$

$$h_{i,j} = h_{f_i} + h_{b_j}$$

$$h_{f_i} = f(U_f w_i + W_f h_{f_{i-1}})$$

$$h_{b_j} = f(U_b w_j + W_b h_{b_{j+1}})$$

Here, i denotes the time-steps of the forward neural network and j denotes the time-steps of the backward neural network. By this, the i'th word in the sequence is combined with every j'th word, where j∈i, ..., N (i.e. the i'th word is composed with itself and the following words in the sequence). N (or n) is the total number of words in the sequence. For a given sequence, $s_{R_{i,j}}$ represents the output score of relation extraction and $s_{E_{i,j}}$ represents the output score of entity recognition for the i'th word from the forward neural network and the j'th word from the backward neural network. Entity extraction is performed on the combined hidden representation $h_{i,j}$ with i=j. $h_{f_i}$ and $h_{b_j}$ are hidden representations of the forward and the backward neural network, respectively. $W_{hR}$ is a weight between the hidden layer $h_{i,j}$ and the output unit or output node of relation and $W_{hE}$ is a weight between the hidden layer $h_{i,j}$ and the output unit of entity. f and g are activation and loss functions. For example, the table entries for the entity-relation table can be obtained by extracting the largest value of the respective output scores of all words, i.e. $s_{R_{i,j \in i:N}}$ and $s_{E_{i,j=i}}$.

According to a further embodiment, the recurrent neural network is configured to use a piggybacking approach for modeling relation to entity dependencies as a part of the interdependencies in the entity and relation extraction tasks.

This embodiment provides the advantage that known entity labels are used to find the relations between them and vice versa. As a result, the performance of the device can be improved. In addition, the sequential learning approach in the proposed recurrent neural network learns entity and relation label dependencies by sharing model parameters and representations, instead of modeling them explicitly. The approach outperforms known state-of-the-art methods by 2.0% for entity recognition and 2.7% for relation classification on CoNLL04 (Conference on Computational Natural Language Learning) dataset.

For example, the information to be processed by the present recurrent neural network is given as an input vector. For example, at time-step t, the input vector can be defined as follows: $input_t = \{C_{RE}, E_{ER}, W_{emb}\}$, where $C_{RE}$ is a count vector to model relation to entity dependencies, $E_{ER}$ is a vector for predicted entities to model entity to relation dependencies and $W_{emb}$ is a word-embedding vector. $W_{emb}$ comprises, for example, the currently processed word along with its current history provided by the forward neural network and/or its following context provided by the backward neural network.

To model entity to relation dependency, firstly entity types are extracted. Named entity labels are written into the diagonal entries of the entity-relation-table. Each predicted entity $E_{ER}$ type is concatenated with its corresponding word embedding vector $W_{emb}$ and input to the model for relation classification.

To model relation to entity dependency, a count vector $C_{RC}$, comprising counts of possible entity types for each word participating in a relation, is concatenated with the corresponding word embedding vector $W_{emb}$ and input to the model for entity recognition.

According to a further embodiment, the piggybacking approach includes that, if a relation label for a relation between two entities of the sentence is increased, each entity label of said two entities is also increased.

Increasing the relation label and/or the entity label means, for example, that the score $s_{R_{i,j} \in i:N}$ and $s_{E_i, j=i}$ is increased. An increased score implies a higher probability that the respective relation or entity is the true one.

According to a further embodiment, the piggy-backing approach is configured to use a deep-learning approach for modeling the interdependencies in the entity and relation extraction tasks.

Deep learning models are in particular successful in modeling complex dependencies in natural language processing tasks, especially entity and relation extraction.

According to a further embodiment, the device further comprises a deriving entity for deriving a list of candidate entities for each word of the sentence participating in one of the relations of the sentence, wherein the list includes a count vector for each of the candidate entities.

A candidate entity represents a possible entity for the word, as derived from the associated relations. For example, in ES1, the word "Alexandria" is associated with relations "ORGBased_In" and "Located_In" (see Table 2). Thus, from the relation "ORGBased_In", possible entities are "L-Loc", "U-Loc", "L-Org" and "U-Org", while for the relation "Located_In" possible entities are "L-Loc" and "U-Loc". As a result, the entities "L-Loc" and "U-Loc" have a count of 2, while the entities "L-Org" and "U-Org" have a count of 1. Table 3 shows such counts for the words "Kahn", "Association", "Alexandria" and "Va" for ES1.

column 2, row 2 (row 1 can be left out because $c_{12}=c_{21}$), i.e. $c_{22} \to c_{23} \to \ldots \to c_{2n}$, and so on along the columns, until $c_{(n-1)n} \to c_{nn}$, because $c_{nn}$ is the last cell that has to be filled according to this approach.

According to a further embodiment, the recurrent neural network includes a number of hidden layers and a third direction neural network for providing a representation of a middle context of the sentence between a word $w_i$ provided to the hidden layers by the forward neural network and a word $w_j$ provided to the hidden layers by the backward neural network.

The middle context comprises the words of the sentence, which are in between two words whose representations are composed at a certain time step.

For example, when off-diagonal elements are analyzed, i.e. $h_{i,j}$ with $i \neq j$ there are situations, for example when $j-i>1$, in which words of the sentence are neither part of the representation $h_{f_i}$ of the forward neural network, nor of the representation $h_{b_j}$ of the backward neural network.

For example, in ES1, when "Association" of the forward neural network is composed with "Va" of the backward neural network, the words "in Alexandria," are not considered by either one. Therefore, these words, which are part of the context, can be taken into account by employing the above embodiment.

According to a second aspect, a method for relation extraction in a natural language sentence having n words is suggested. In a first step, a recurrent neural network for joint entity and relation extractions of entities and relations between the entities in the sentence is provided. The recurrent neural network includes a forward neural network and a backward neural network, wherein the forward neural network is configured to provide a representation of a current history for a certain word of the sentence, and

TABLE 3

Count of candidate entity types derived from associated relations.

| Word | Associated Relations | Candidate entities | | | | | | |
|---|---|---|---|---|---|---|---|---|
| | | L-PER | U-PER | L-LOC | U-LOC | L-ORG | U-ORG | any |
| Kahn | work for | 1 | 1 | 0 | 0 | 1 | 1 | 0 |
| Association | ORGBased_in ORGBased_in Work_for | 1 | 1 | 2 | 2 | 3 | 3 | 0 |
| Alexandria | ORGBased_in Located_in | 0 | 0 | 2 | 2 | 1 | 1 | 0 |
| Va | ORGBased_in Located_in | 0 | 0 | 2 | 2 | 1 | 1 | 0 |

According to a further embodiment, the device further comprises a learning entity for piggybacking the count vectors of the candidate entities to enable learning relation to entity dependencies in order to improve the extractions of the entities in the sentence.

According to a further embodiment, the forward neural network and the backward neural network form a bidirectional architecture.

In the bidirectional architecture, each connection of two units of the neural network, i.e. connection between two neurons, is bidirectional.

According to a further embodiment, the recurrent neural network is configured to fill the cells of the entity-relation table according to a certain table-filling rule.

For example, the table-filling rule can be to start with column 1, row 1 (cell $c_{11}$) and move down the rows in the first column, i.e. $c_{11} \to c_{12} \to c_{13} \to \ldots \to c_{1n}$, then move to wherein the backward neural network is configured to provide a representation for a following context of the certain word of the sentence. In a second step, an entity-relation table for storing entity labels for the entities and relation labels for the relations is provided. Both the entity labels and the relation labels are defined as instances of binary relationships between certain words $w_i$ and $w_j$ in the sentence, with $i \in [1, \ldots, n]$, and $j \in [1, \ldots, n]$, wherein each of the entity labels is a first binary relationship for $i=j$, and wherein each of the relation labels is a second binary relationship for $i \neq j$. In a third step, the cells of the provided entity-relation table are filled using the provided the recurrent neural network.

This method is in particular useful for efficient natural language processing by employing a device as according to the first aspect.

The embodiments and features according to the first aspect are also embodiments of the second aspect.

According to a third aspect, a computer program product including a program code for executing the method according to the second aspect when run on at least one computer is suggested.

A computer program product, for example a computer program means, can be provided as a storage device such as a memory card, a USB-stick, a CD-ROM, a DVD or as a file downloadable from a server in a network. For example, this can performed by transmitting a respective file containing the computer program product in a wireless communication network.

Further objects, features and advantages of the present invention will become apparent from the subsequent description and depending claims, taking in conjunction with the accompanying drawings.

BRIEF DESCRIPTION OF THE DRAWINGS

In the Figures, like reference numerals designate like or functionally equivalent elements, unless otherwise indicated.

DETAILED DESCRIPTION OF THE EMBODIMENTS

Figure 1:
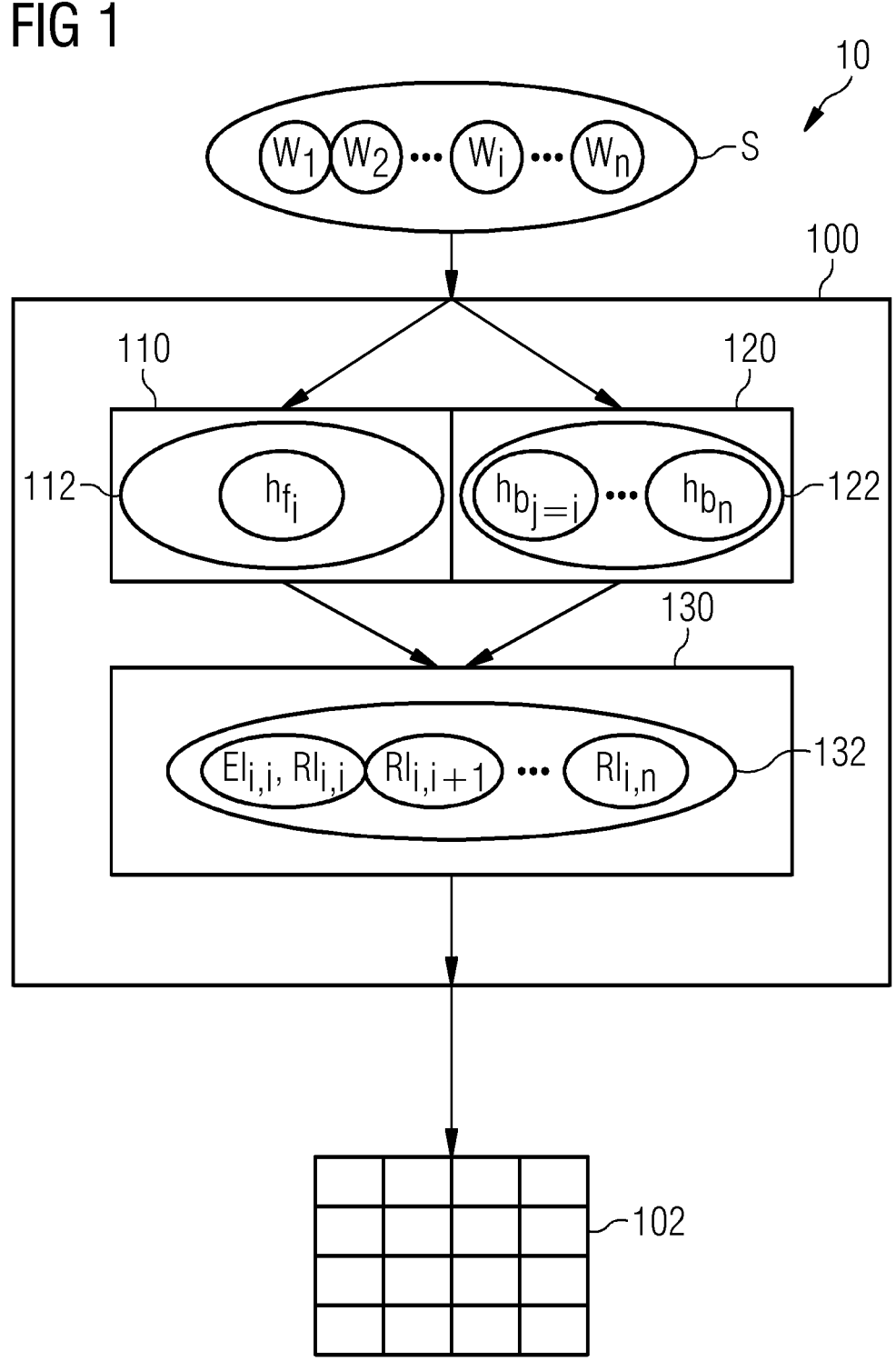
FIG. 1 shows a schematic block diagram of an embodiment of a device for relation extraction, processing a natural language sentence having n words.

FIG. 1 shows a schematic block diagram of an embodiment of a device 10 for relation extraction, processing a natural language sentence S having n words $w_1$-$w_n$. The device 10 comprises a recurrent neural network 100 and an entity-relation table 102. The recurrent neural network 100 comprises a forward neural network 110, a backward neural network 120 and a number of hidden layers 130. Note, that the units drawn as ellipses, the sentence S, the set of hidden representations 112, 122 and the set of output entity labels 132 are not structural features, but rather show an intermediate state or a current information being processed by the respective device.

FIG. 1 shows a situation at a certain time-step during a period, at which the device 10 is processing the sentence S. At the certain time-step, the recurrent neural network 100 is currently processing the word $w_i$ of the sentence S. This means, that the recurrent neural network 100 is currently evaluating or extracting an entity label $El_{i,j=i}$ for word $w_i$ and evaluating or extracting relation labels $Rl_{i,j=i}, \ldots, Rl_{i,j=n}$ for word $w_i$ with respect to words $w_i, \ldots, w_n$. This can also be called joint entity recognition and relation extraction with respect to word $w_i$.

The sentence S having words $w_1$-$w_n$ is fed to the recurrent neural network 100, which means that it is input to the forward neural network 110 and the backward neural network 120.

The forward neural network 110 is configured to provide a set of (hidden) representations 112 of a current history $h_{f_i}$ for the word $w_i$. The representation of a current history $h_{f_i}$ for word $w_i$ includes the context of the word $w_i$ in a forward direction FD (see FIGS. 3, 5).

The backward neural network 120 is configured to provide a set of (hidden) representations 122 of the following context $h_{b_j}$ for each of the words $w_{j=i}, \ldots, w_{j=n}$. The representation of the following context $h_{b_j}$ includes the context of the word $w_j$ in a backward direction BD (see FIGS. 3, 5).

The representation of a current history $h_{f_i}$ and the representations of the following context $h_{b_j}$ are fed to the hidden layers 130 of the recurrent neural network 100. The hidden layers 130 form word compositions by composing the representations of a current history $h_{f_i}$ and a representation of the following context $h_{b_j}$, one by one. Depending on the composition $h_{i,j}$ a number of output nodes (not shown) are activated, each of which is allocated to a certain entity label $El_{i,j=i}$ or a certain relation label $Rl_{i,j}$. All output entity and relation labels form the set of output entity and relation labels 132 of the hidden layers 130. A more detailed description of how the recurrent neural network 100 performs entity recognition and relation classification is given below with reference to FIG. 3.

The entity label $El_{i,i}$ is written into the corresponding cell on the diagonal of the entity-relation table 102 (see also FIG. 4) and the relation labels $Rl_{i,j}$ are written into their corresponding cells in the entity-relation table 102.

At other time-steps, the device 10 is processing the other words of the sentence S, until the entity-relation table 102 is filled completely.

Figure 2:
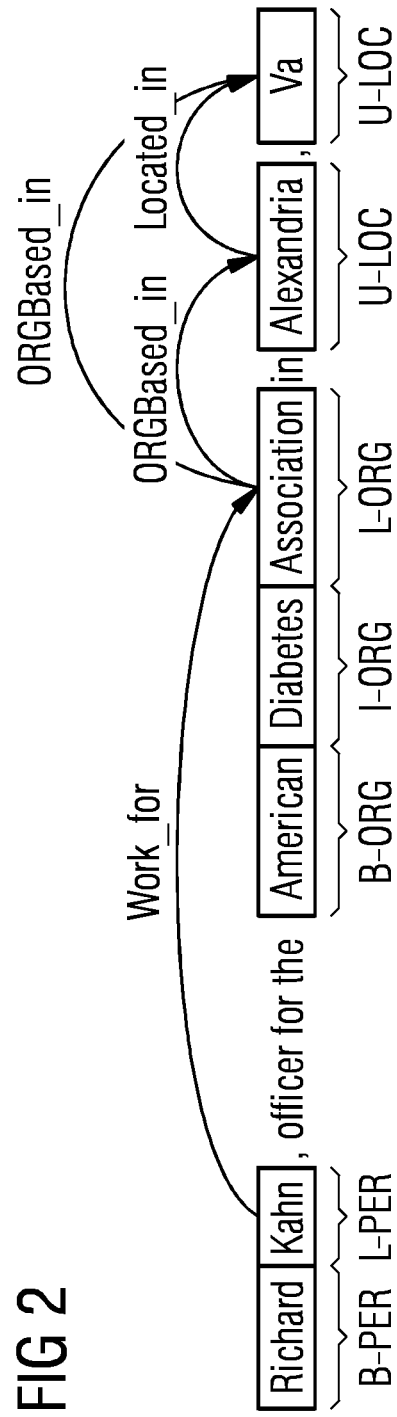
FIG. 2 shows a depiction of an exemplary sentence with denoted entities and relations.

FIG. 2 shows a depiction of an exemplary sentence with denoted entities and relations between the entities.

In the example of FIG. 2, entities are defined on words $w_i$. In order to be able to recognise entities comprising more than one word, the entities are provided with a marker in accordance with the BILOU-scheme. For example, the person "Richard Kahn" consists of two words, which are recognised as belonging to one entity, and thus are labelled B-PER in the case of "Richard", where B-PER stands for "Beginning-Person", and L-PER in the case of KAHN, where L-PER stands for "Last-Person". Similarly, I-ORG stands for "In-Organization" and U-LOC stands for "Unit-Location".

In the example of FIG. 2, the relations are defined on the last word in cases of multi-word entities. Here, these are "Kahn" (L-PER) and "Association" (L-ORG).

In addition, multiple relations are obtained. In this example, for the L-ORG entity "Association" participates in three relations: Work_For with respect to L-PER "Kahn", and times ORGBased_in with respect to U-LOC "Alexandria" as well as "Va".

Figure 3:
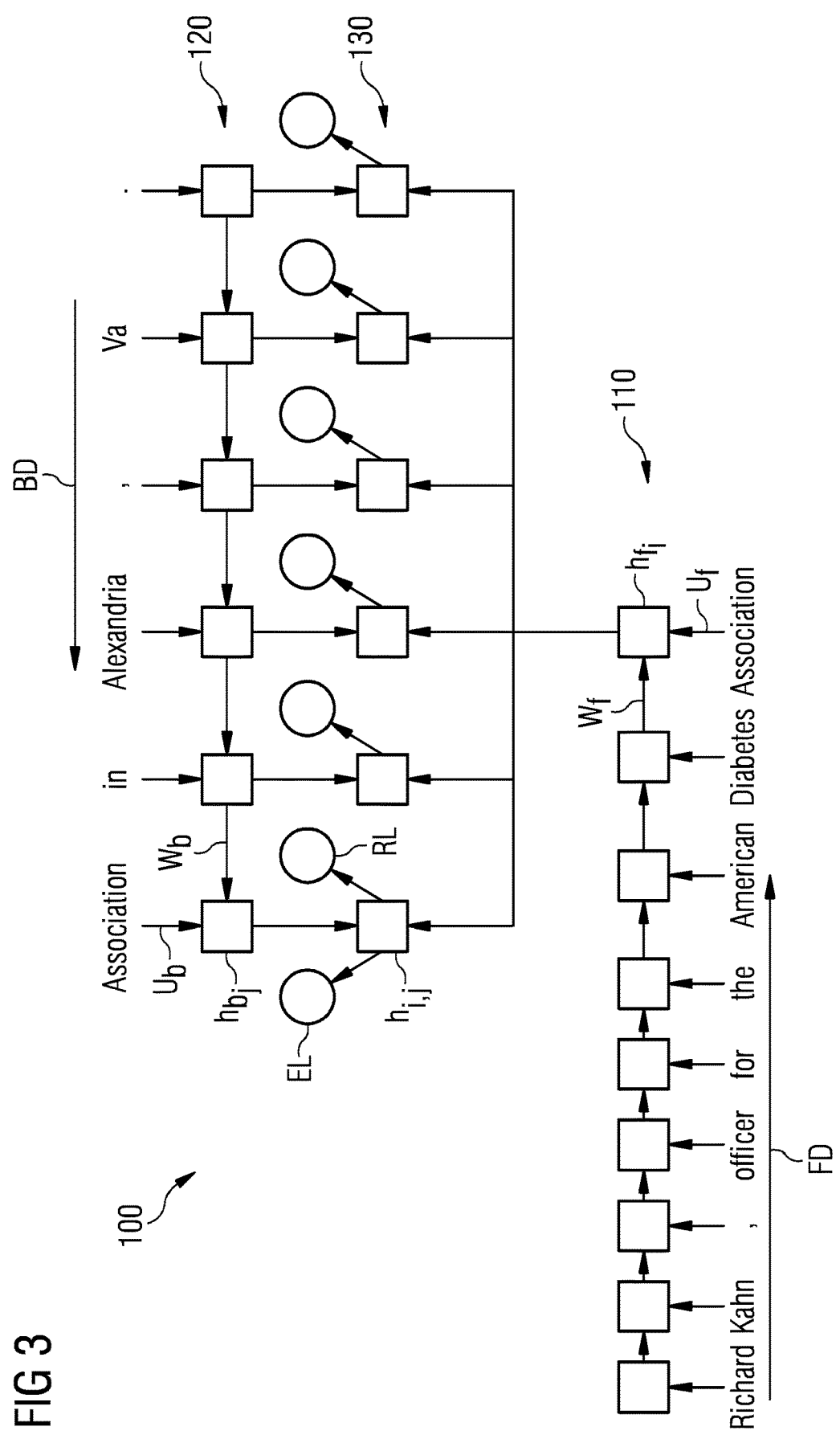
FIG. 3 shows a schematic block diagram of an embodiment of a multi-task table-filling recurrent neural network at a given time-step during joint relation extraction in a sentence.

FIG. 3 shows a schematic block diagram of an embodiment of a multi-task table-filling recurrent neural network 100 at a given time-step during joint relation extraction in a sentence S. For example, the recurrent neural network 100 is the one shown in FIG. 1. It comprises a forward neural network 110, a backward neural network 120 and a number of hidden layers 130.

The forward neural network 110 is configured to provide a hidden representation of a current history $h_{f_i}$ of word $w_i$ to the hidden layers 130. In the example of FIG. 3, the word "Association" is currently processed. As can be seen, the hidden representation $h_{f_i}$ is created from an input vector $U_f$ for the word "Association" as well as a forward recurrent weight matrix $W_f$, wherein $W_f$ stems from the words of the sentence S in a forward direction FD up to the word $w_i$.

On the other hand, the backward neural network 120 provides a hidden representation of a following context $h_{b_j}$ for each of the words $w_j$, $j=i \ldots n$, of the sentence S, which are not provided to the forward neural network 110 at the given time-step, to the hidden layers 130. The hidden representation $h_{b_j}$ is created from an input vector $U_b$ of the word $w_j$ as well as a backward recurrent weight matrix $W_b$ of the following words, wherein $W_b$ stems from the words $w_j$ of sentence S in a backward direction BD, from the last word down to word $w_{j=i}$.

The hidden layers 130 get the hidden representations $h_{f_i}$ and $h_{b_j}$ and create a composition $h_{i,j}$ from them. From this composition $h_{i,j}$, the hidden layers 130 yield scores or probabilities for entities and relations on these entities. A number of output nodes, which are allocated to certain entity labels El and/or relation labels Rl are activated by the hidden layers 130 in dependence on the evaluated score for a given composition $h_{i,j}$. For example, for the case of i=j, the respective representation for the word "Association" is fed to the hidden layers 130 from both the forward neural network 110 and the backward neural network 120. The output comprises the entity label EL "L-ORG" (see FIG. 2) and the relation label RL "⊥", which means "no relation". However, for the case of the composition of the hidden representation $h_{f_i}$ for the word "Association" from the forward neural network 110 and the hidden representation $h_{b_j}$ for the word "Alexandria" from the backward neural network 120, the node corresponding to "ORGBased_In" relation will be activated.

Figure 4:
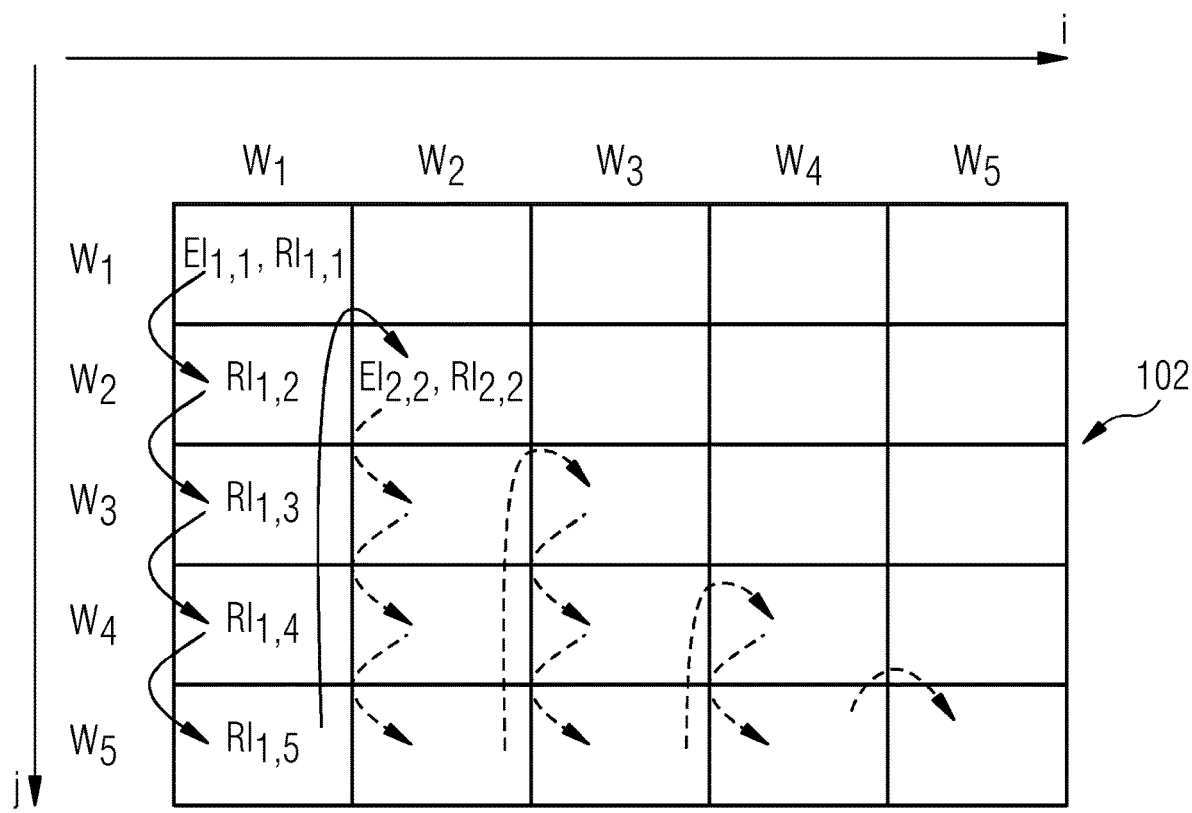
FIG. 4 shows a schematic block diagram of an example for a table-filling scheme.

FIG. 4 shows a schematic block diagram of an example for a table-filling scheme for filling of an entity-relation table 102 with entity labels $El_{i,j=i}$ and relation labels $Rl_{i,j=i, \ldots, n}$, for words $w_1$-$w_n$ of a sentence S.

The columns of the entity-relation table 102 are labelled with the words $w_i$, where $i=1, \ldots, n$, from the left to the right, as shown by the arrow i. The rows of the entity-relation table 102 are labelled with the word $w_j$, where $j=1, \ldots, n$, from top to bottom, as shown by the arrow j.

The scheme or rule starts in the top left cell of the entity-relation table 102. This is a cell on the diagonal of the table 102, therefore an entity label $El_{1,1}$ and a relation label $Rl_{1,1}$ are obtained. After filling this first cell, the iterator j is increased by one, and the cell below the first cell is filled with the relation label $Rl_{1,2}$ corresponding to the relation between word $w_1$ and $w_2$. In this way, as shown by the arrows, each cell of the first row is filled, and after the relation label $Rl_{1,5}$ between $w_1$ and $w_5$ is filled into the corresponding cell, the scheme continues on the diagonal cell of the second row. As shown by the arrows, the scheme continues like this until each cell of the lower half of the table 102 is filled with the corresponding entity labels $El_{i,i}$ and relation la-labels $Rl_{i,j}$.

Figure 5:
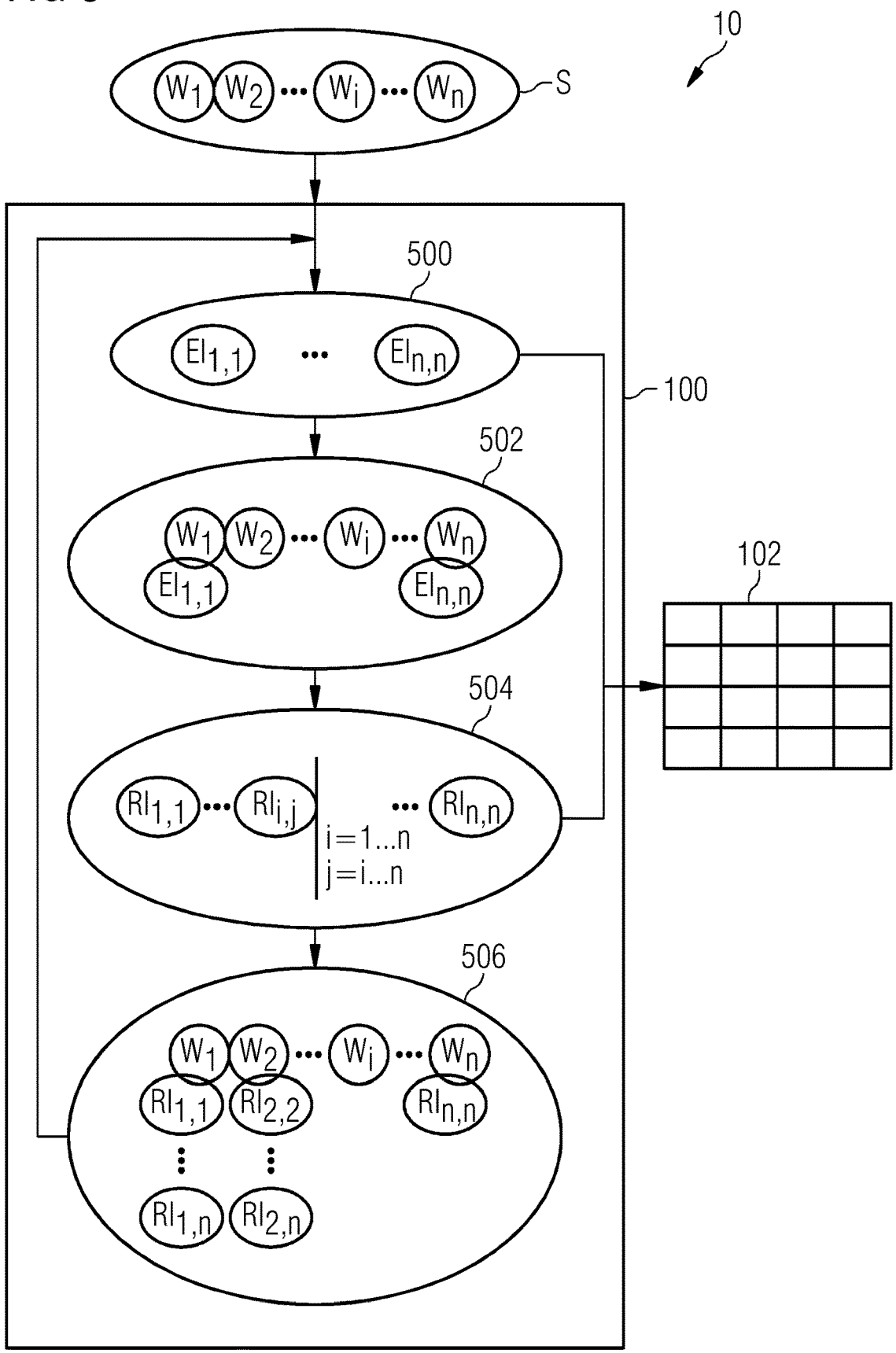
FIG. 5 shows a schematic block diagram of an embodiment of a device for joint relation extraction, processing a sentence having n words.

FIG. 5 shows a schematic block diagram of an embodiment of a device 10 for joint entity and relation extraction, currently processing a sentence S having n words $w_1$-$w_n$. The device 10 comprises a recurrent neural network 100, which is in particular configured for relation extraction using a piggybacking approach, and an entity-relation table 102. The recurrent neural network 100 can be identical to the one of FIG. 1, however, structural details are not shown here, in order to focus on the explanation of the piggybacking approach.

The sentence S is fed to the recurrent neural network 100. In a first iteration, the recurrent neural network analyses compositions of the same words, in order to extract a set 500 of entity labels $El_{1,1}$-$El_{n,n}$. The extracted entity labels El are then written into the corresponding cells of the entity-relation table 102.

Then, a set 502 of the words $w_i$ along with the corresponding entity label $El_{i,i}$ is created. It can be said, that the words $w_i$ piggyback their corresponding entity label $El_{i,i}$. Starting from this set 502, relation labels $Rl_{i,j}$ are extracted. The piggybacked entity labels $El_{i,i}$ are useful for finding proper relations between the words $w_i$.

A set 504 of relation labels $Rl_{i,j}$ is obtained and is written to the entity-relation table 102.

Then, a set 506 of the words wi along with all their assigned relation labels $Rl_{i,j}$ is created. Again, the words wi piggyback their corresponding relation labels $Rl_{i,j}$. From here, a next iteration of entity extraction is performed. This time, the entity labels $El_{i,i}$ are influenced by the found relations between the entities. Entity labels $El_{i,i}$ are increased in dependence of the found relation labels $Rl_{i,j}$.

This iterative process may be performed several times. With each iteration, the corresponding output entity label $El_{i,i}$ or relation label $Rl_{i,j}$ can be increased.

It should be understood that the description above is merely an example and that a real recurrent neural network 100 may perform two or many of the above explained steps simultaneously or concurrently.

Further, it is not necessary that the process starts with finding entity labels $El_{i,i}$ as described above, but with finding relation labels $Rl_{i,j}$ or by performing both at the same time and interdependently. Extracting the entity labels $El_{i,i}$ and the relation labels $Rl_{i,j}$ is a highly dynamic task and intermediate stages of the recurrent neural network 100 can be complicated or not well defined.

Figure 6:
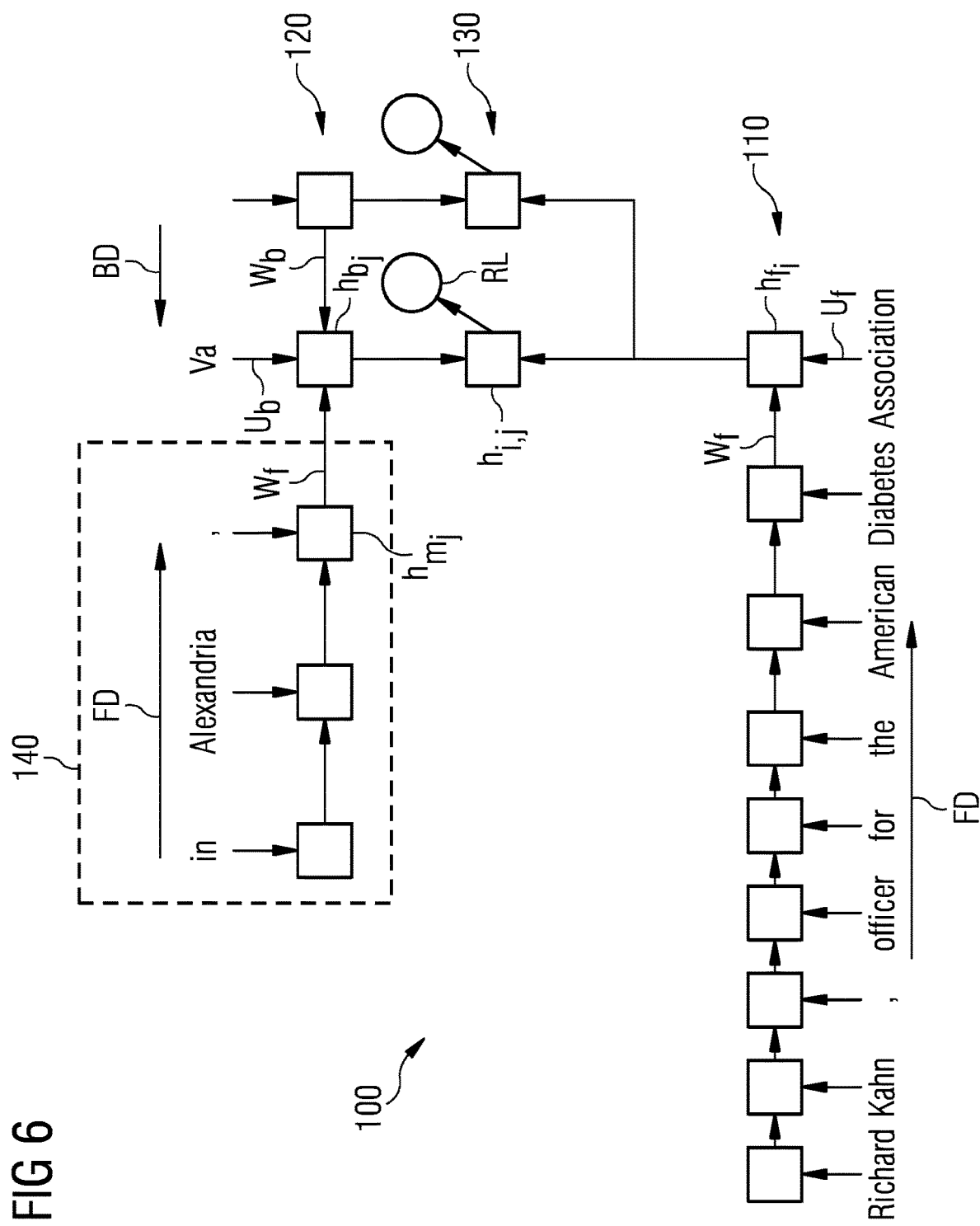
FIG. 6 shows a schematic block diagram of an embodiment of a context-aware table-filling multi-task recurrent neural network at a given time-step.

FIG. 6 shows a schematic block diagram of an embodiment of a context-aware table-filling multi-task recurrent neural network 100 at a given time-step, currently processing a sentence S. The recurrent neural network 100 comprises a forward neural network 110, a backward neural network 120, a number of hidden layers 130 and a third direction neural network 140. The recurrent neural network 100 has all the features of the embodiment according to FIG. 3, and additionally the third direction neural network 140 is configured to provide a representation of a middle context $h_{m_j}$.

In the example of FIG. 6, the recurrent neural network 100 currently processes the composition $h_{i,j}$ of the hidden representations $h_{f_i}$ of the word "Association" of the forward neural network 110 and the hidden representation $h_{b_j}$ of the word "Va" of the backward neural network 120. However, in contrast to FIG. 3, the hidden representation $h_{b_j}$ is created from the vector $U_b$ of the word "Va", the backward recurrent weight matrix $W_b$ of the following context and also the forward recurrent weight matrix $W_f$ of the middle context, which would be missed without the third direction in the neural network 140.

The third direction neural network 140 provides a hidden representation $h_{m_j}$ of the words of the sentence S, in a forward direction FD, which are in between the currently processed word $w_i$ from the forward neural network 110 and the currently processed word $w_j$ from the backward neural network 120.

As shown in FIG. 6, the third direction neural network 140 provides the representation $h_{m_j}$ directly to the backward neural network 120, which then creates the hidden representation $h_{b_j}$ to be fed to the hidden layers 130. In contrast to this, it is also possible that the third direction neural network 140 provides the representation of the middle context $h_{m_j}$ directly to the hidden layers 130.

Figure 7:
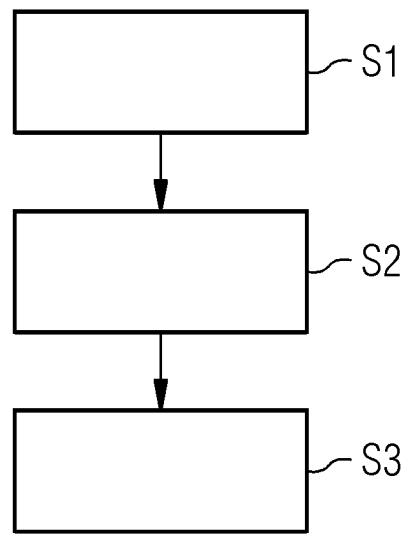
FIG. 7 shows an embodiment of a sequence of method steps for relation extraction of a sentence having n words.

FIG. 7 shows an embodiment of a sequence of method steps S1, S2, S3 for relation extraction of a sentence S having n words $w_1$-$w_n$. For example, the method can be performed using the device 10 shown in FIG. 1 and/or FIG. 5.

In a first step S1, a recurrent neural network 100 (see FIGS. 1, 3, 5, 6) is provided. The recurrent neural network 100 is configured for joint entity and relation extractions between the entities of the sentence S, with a forward neural network 110 and a backward neural network 120.

For example, the recurrent neural network 100 performs joint entity-relation extraction as described with reference to FIGS. 1, 3, 5 and/or 6.

In step S2 an entity-relation table 102 is provided. The entity-relation table 102 is configured for storing entity labels $El_{i,i}$ and relation labels $Rl_{i,j}$. Both entity labels $El_{i,i}$ and relation labels $Rl_{i,j}$ are defined as instances of binary relationships between certain words $w_i$ and $w_j$ of the sentence S.

In the third step S3, the cells of the entity-relation table 102 are filled by using the provided recurrent neural network 100.

For example, the table-filling can be performed according to a scheme as shown in FIG. 4.

Although the present invention has been described in accordance with preferred embodiments, it is obvious for a person skilled in the art that modifications are possible in all embodiments.

REFERENCE NUMERALS 10 device
100 recurrent neural network
102 entity-relation table
110 forward neural network
112 set of hidden representations
120 backward neural network
122 set of hidden representations
130 hidden layer
132 set of output entity and relation labels
140 third direction neural network
BD backward direction
El entity label
$El_{1,1}$ entity label
$El_{2,2}$ entity label
$El_{i,i}$ entity label
FD forward direction
$h_{b_j}$ hidden representation
$h_{b_{j-1}}$ hidden representation
$h_{b_n}$ hidden representation
$h_f$ hidden representation
$h_{m_j}$ hidden representation
$h_{i,j}$ hidden representation
Rl relation label
$Rl_{1,1}$ relation label
$Rl_{1,2}$ relation label
$Rl_{1,2}$ relation label
$Rl_{1,4}$ relation label
$Rl_{1,5}$ relation label
$Rl_{1,n}$ relation label
$Rl_{2,2}$ relation label
$Rl_{2,n}$ relation label
$Rl_{i,i}$ relation label
$Rl_{i,i+1}$ relation label
$Rl_{i,j}$ relation label
$Rl_{i,n}$ relation label
$Rl_{n,n}$ relation label
S sentence
S1 method step
S2 method step
S3 method step
$U_b$ vector
$U_f$ vector
$w_1$ Word
$w_2$ Word
$w_3$ Word
$w_4$ Word
$w_5$ Word
$w_i$ Word
$w_n$ Word
$W_b$ backward recurrent weight matrix
$W_f$ forward recurrent weight matrix

The invention claimed is:

1. A computing system relation extraction in a natural language sentence having n words, the computing system comprising:
 a processor for processing the natural language sentence, wherein the processor uses a recurrent neural network for joint entity and relation extractions of entities and relations between the entities in the sentence, and an entity-relation table for storing entity labels for the entities and relation labels for the relations, wherein both the entity labels and the relation labels are defined as instances of binary relationships between certain words $w_i$ and $w_j$ in the sentence, with i∈[1, . . . , n], and j∈[1, . . . , n], wherein each of the entity labels is a first binary relationship for i=j, and wherein each of the relation labels is a second binary relationship for i≠j,
 wherein the recurrent neural network is configured to fill the cells of the entity-relation table and includes a forward neural network and a backward neural network, wherein the forward neural network is configured to provide a representation of a current history for a certain word of the sentence, and wherein the backward neural network (120) is configured to provide a representation for a following context of the certain word of the sentence.

2. The computing system of claim 1,
 wherein the recurrent neural network is a context-aware recurrent neural network framework configured for word-level relation learning via word-pair compositions utilizing their contexts in the sentence.

3. The computing system of claim 1,
 wherein the recurrent neural network is configured to model interdependencies in entity and relation extraction tasks for the joint entity and relation extractions of the entities and the relations in the sentence.

4. The computing system of claim 3,
 wherein the recurrent neural network is configured to use a piggybacking approach for modeling relation to entity dependencies as a part of the interdependencies in the entity and relation extraction tasks.

5. The computing system of claim 4,
 wherein the piggybacking approach includes that, if a relation label for a relation between two entities of the sentence is increased, each entity label of said two entities is also increased.

6. The computing system of claim 4,
wherein the piggybacking approach is configured to use a deep-learning approach for modeling the interdependencies in the entity and relation extraction tasks.

7. The computing system of claim 3,
further comprising a deriving entity for deriving a list of possible candidate entities for each word of the sentence participating in one of the relations of the sentence, wherein the list includes a count vector for each of the candidate entities.

8. The computing system of claim 7,
further comprising a learning entity for piggybacking the count vectors of the candidate entities to enable learning relation to entity dependencies in order to improve the extractions of the entities in the sentence.

9. The computing system of claim 1,
wherein the forward neural network and the backward neural network form a bidirectional architecture.

10. The computing system of claim 1,
wherein the recurrent neural network is configured to fill the cells of the entity-relation table according to a certain table-filling rule.

11. The computing system of claim 1,
wherein the recurrent neural network includes a number of hidden layers and a third direction neural network for providing a representation of a middle context of the sentence between a word $w_i$ provided to the hidden layers by the forward neural network and a word $w_j$ provided to the hidden layers by the backward neural network.

12. A method for relation extraction in a natural language sentence having n words, the method comprising:
providing a recurrent neural network for joint entity and relation extractions of entities and relations between the entities in the sentence, wherein the recurrent neural network is configured to fill the cells of an entity-relation table and includes a forward neural network and a backward neural network, wherein the forward neural network is configured to provide a representation of a current history ($h_{fi}$) for a certain word of the sentence, and wherein the backward neural network is configured to provide a representation for a following context of the certain word of the sentence,
providing an entity-relation table for storing entity labels for the entities and relation labels for the relations, wherein both the entity labels and the relation labels are defined as instances of binary relationships between certain words $w_i$ and $w_j$ in the sentence, with $i \in [1, \ldots, n]$, and $j \in [1, \ldots, n]$, wherein each of the entity labels is a first binary relationship for $i=j$, and wherein each of the relation labels is a second binary relationship for $i \neq j$, and
filling the cells of the provided entity-relation table using the provided recurrent neural network.

13. The method of claim 12,
wherein the recurrent neural network is a context-aware recurrent neural network framework configured for word-level relation learning via word-pair compositions utilizing their contexts in the sentence.

14. The method of claim 12,
wherein the recurrent neural network is configured to model interdependencies in entity and relation extraction tasks for the joint entity and relation extractions of the entities and the relations in the sentence.

15. The method of claim 14,
wherein the recurrent neural network is configured to use a piggybacking approach for modeling relation to entity dependencies as a part of the interdependencies in the entity and relation extraction tasks.

16. The method of claim 15,
wherein the piggybacking approach includes that, if a relation label for a relation between two entities of the sentence is increased, each entity label of said two entities is also increased.

17. The method of claim 15,
wherein the piggybacking approach is configured to use a deep-learning approach for modeling the interdependencies in the entity and relation extraction tasks.

18. The method of claim 12,
wherein the forward neural network and the backward neural network form a bidirectional architecture.

19. The method of claim 12,
wherein the recurrent neural network includes a number of hidden layers and a third direction neural network for providing a representation of a middle context of the sentence between a word $w_i$ provided to the hidden layers by the forward neural network and a word $w_j$ provided to the hidden layers by the backward neural network.

20. A computer program product, comprising a computer readable hardware storage device storing a computer readable program code, the computer readable program code comprising an algorithm that when executed by a computer processor of a computing system implements a method for relation extraction in a natural language sentence having n words, the method comprising:
providing a recurrent neural network for joint entity and relation extractions of entities and relations between the entities in the sentence, wherein the recurrent neural network is configured to fill the cells of a entity-relation table and includes a forward neural network and a backward neural network, wherein the forward neural network is configured to provide a representation of a current history ($h_{fi}$) for a certain word of the sentence, and wherein the backward neural network is configured to provide a representation for a following context of the certain word of the sentence,
providing an entity-relation table for storing entity labels for the entities and relation labels for the relations, wherein both the entity labels and the relation labels are defined as instances of binary relationships between certain words $w_i$ and $w_j$ in the sentence, with $i \in [1, \ldots, n]$, and $j \in [1, \ldots, n]$,
wherein each of the entity labels is a first binary relationship for $i=j$, and wherein each of the relation labels is a second binary relationship for $i \neq j$, and
filling the cells of the provided entity-relation table using the provided recurrent neural network.

* * * * *